Sept. 18, 1928.  
P. BUDA  
STREAM MOTOR  
Filed Sept. 14, 1925  
1,684,469  
3 Sheets-Sheet 1

INVENTOR:  
PASQUALE BUDA.  
By Edward E. Lugan  
ATTORNEY.

Sept. 18, 1928.  
P. BUDA  
1,684,469  
STREAM MOTOR  
Filed Sept. 14, 1925  
3 Sheets-Sheet 2
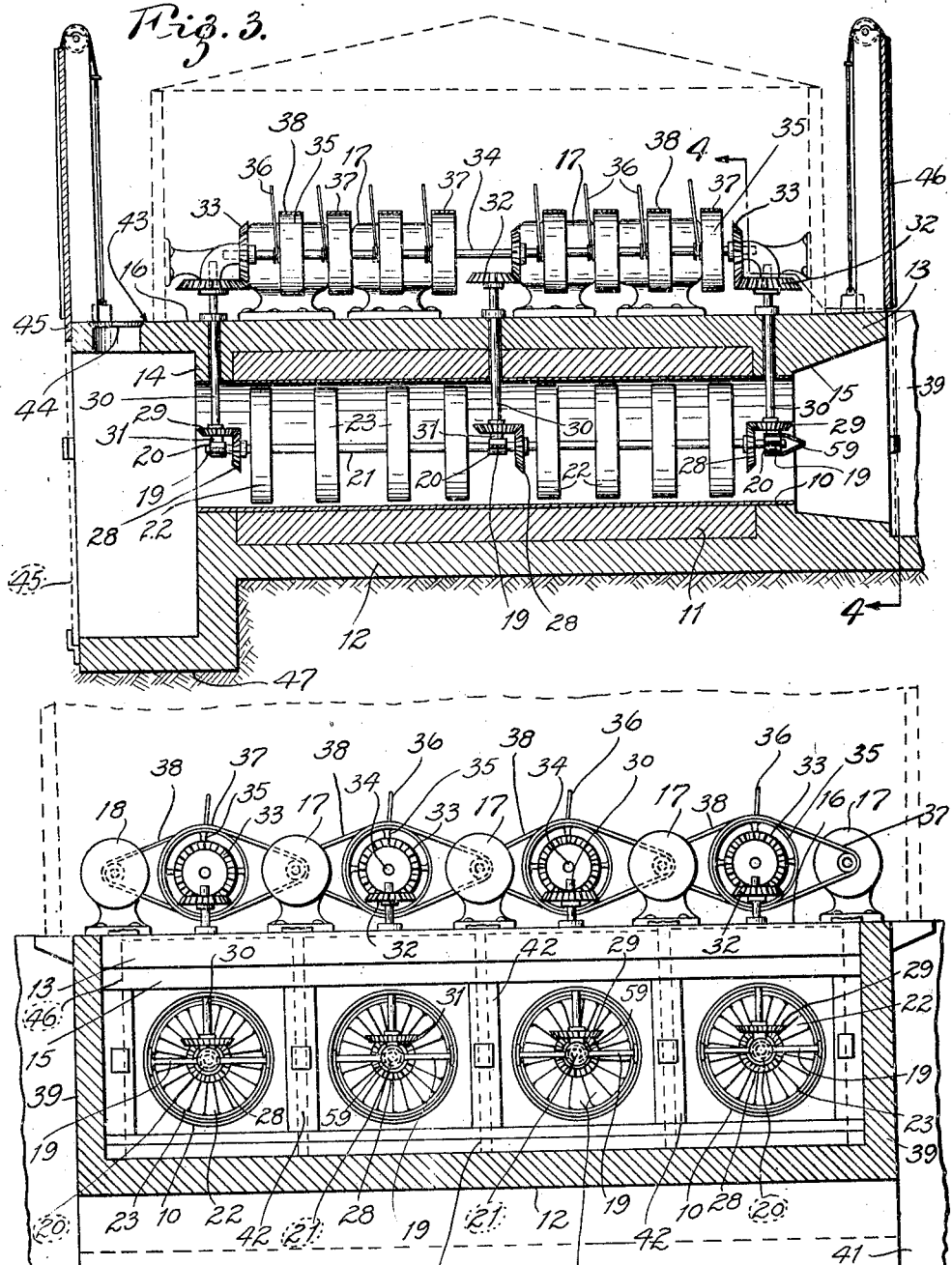

Sept. 18, 1928.　　　　　　　　　　　　　　1,684,469
P. BUDA
STREAM MOTOR
Filed Sept. 14, 1925　　　3 Sheets-Sheet 3
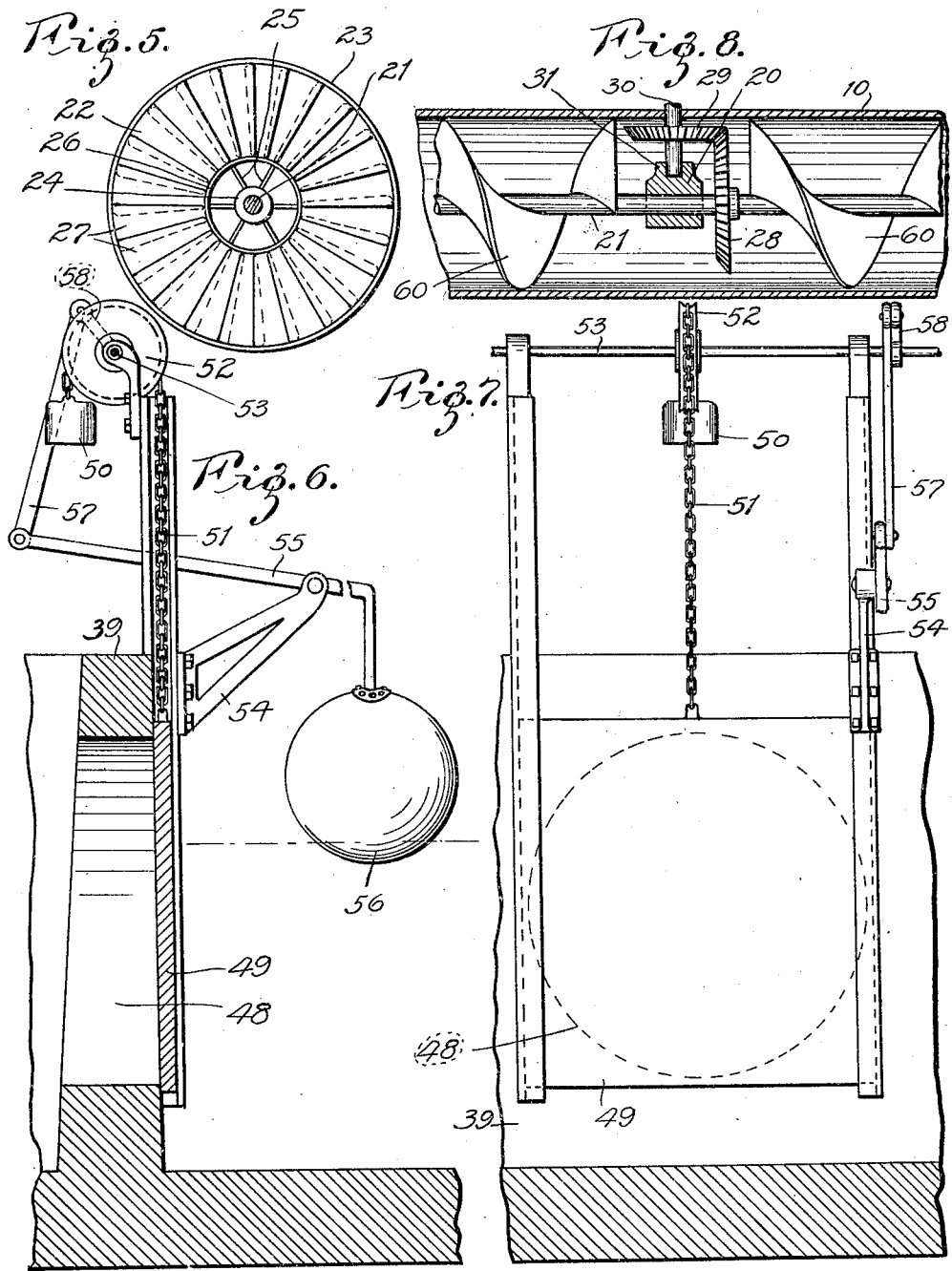
INVENTOR:-
PASQUALE BUDA.
ATTORNEY.

Patented Sept. 18, 1928.

1,684,469

UNITED STATES PATENT OFFICE.

PASQUALE BUDA, OF NEW YORK, N. Y., ASSIGNOR OF ONE-FOURTH TO FREDERICK HOROWIT, OF ST. LOUIS, MISSOURI.

STREAM MOTOR.

Application filed September 14, 1925. Serial No. 56,294.

My invention relates to improvements in stream motors, and has for its object a stream motor which can be installed without the necessity of building a dam to impound a large quantity of water and consequently the flooding of valuable land is eliminated.

A further object is to construct a stream motor which can be installed in any navigable stream in such a position as not to obstruct the channel, and due to the fact that no dam for impounding the waters is necessary, expensive locks and their maintenance are eliminated.

In the drawings:

Fig. 3 is an enlarged longitudinal-vertical view through one of the tunnels, showing the position of the turbines and the manner of transmitting the power;

Fig. 4 is a cross-section taken on the line 4—4 of Fig. 3;

Fig. 5 is a front view of one of the turbines;

Fig. 6 is an enlarged view of the automatic means employed for controlling the water;

Fig. 7 is a face view of one of the flood gates employed; and

Fig. 8 is an enlarged longitudinal section showing a modified form of turbine.

Figure 2:
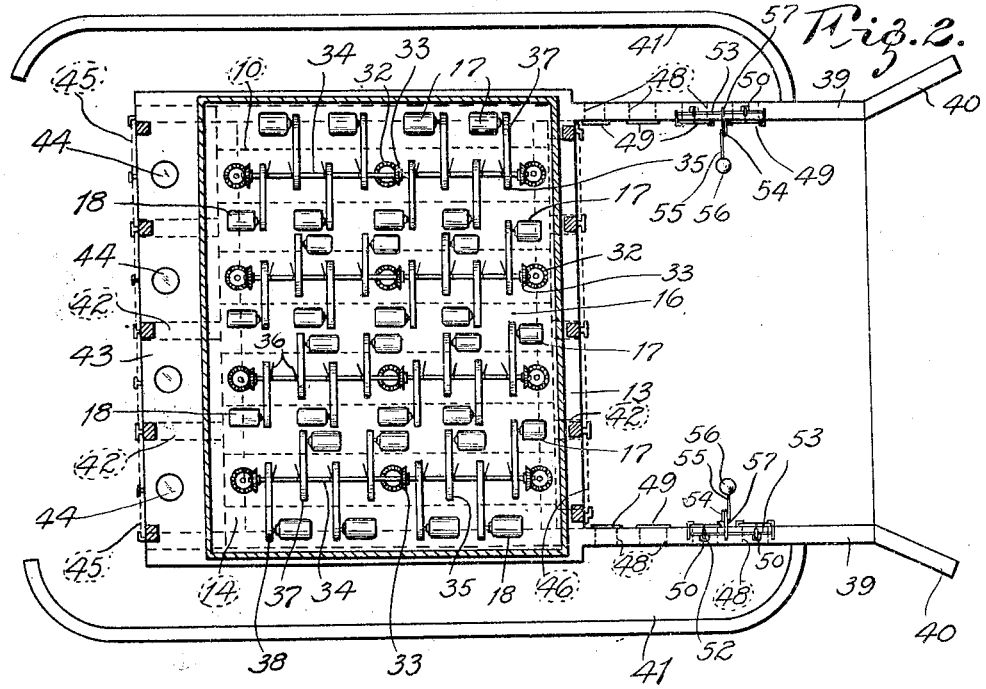
Fig. 2 is a top plan view of the same, with the generator house in section.

In the construction of my device I employ a tube 10, which is preferably formed of metal and which is imbedded in a filler 11. This filler may be earth, concrete, cinders or the like. This filler, in turn, rests upon the base 12 which is laid on the bed of the stream and which is provided with a front wall 13 and a rear wall 14. The front wall 13 is provided with flared openings 15 which correspond in number to the number of tunnels employed and which are concentric therewith.

16 represents the floor of the power house, on which are supported a plurality of generators 17 and 18. Extending across the tunnels 10 are braces 19, which have bearings 20 secured thereto in any well known manner. Extending through these bearings is mounted a shaft 21, and mounted on the shaft 21 at spaced-apart intervals, are turbines 22. These turbines consist preferably of a rim 23 and a hub 24. The hub 24 is provided with spokes 25, which in turn support the rim 26.

Secured to the rims 23 and 26, and at an angle to the shaft 21, are paddles or blades 27. These blades are all inclined in the same direction, so that the passage of the water therethrough will have a tendency to rotate the turbines. This rotation is communicated to the shaft 21 by having the hubs 24 fixed to the shaft in any well known, such as teeing or the like.

Mounted on the shaft 21 are bevel gears 28. These gears mesh with like gears 29 on the vertical shafts 30. The lower ends of these shafts have bearing in a boss 31 formed integral with the bearing 20. The shafts extend through the floor 16 and are provided on their upper ends with bevel gears 32, which in turn mesh with bevel gears 33 mounted on a shaft 34. This shaft preferably extends parallel to the shaft 21 and has mounted thereon a plurality of pulleys 35. The pulleys are loosely mounted on the shaft, but may be connected thereto by means of clutches which are operated by the levers 36. The purpose of these clutches will be explained in detail later.

The generators 17 are driven by means of belts 37 and the generators 18 by means of belts 38. These belts are passed around the pulleys 35.

Figure 1:
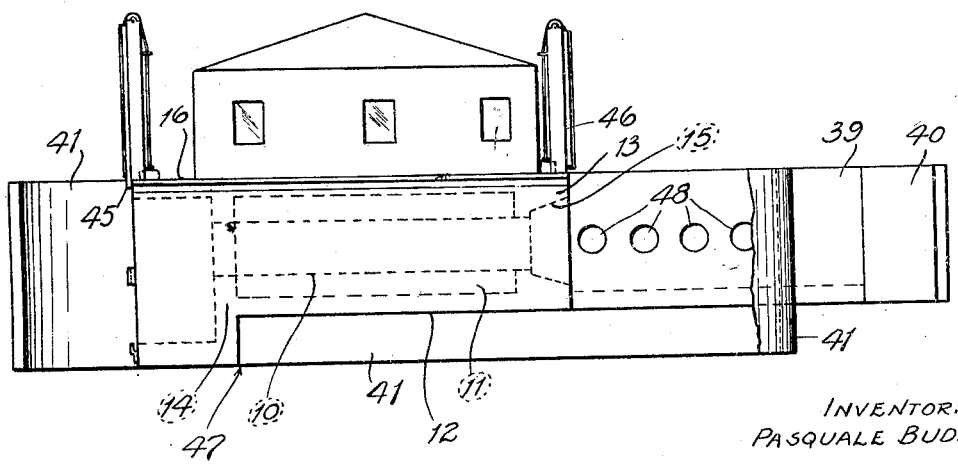
Fig. 1 is a side elevation of my device, with parts broken away.

Located in front of the wall 13 are forwardly extending walls 39, the forward portions of which are flared outwardly as at 40. The purpose of this outward flare is to direct the water between the walls 39 and consequently to the tunnels. 41 represents spill-ways through which surplus water is directed in the event that the quantity of water passing between the walls 39 is increased for any reason whatever. This is necessary to prevent the water from piling up and flooding the generator house. The spill-ways terminate at the rear of the generator house, as illustrated in Figs. 1 and 2.

Located between the tunnels are walls 42, which are decked over as at 43. This deck is provided with a manhole and cover 44. Located immediately to the rear of the walls 42 are gates 45, which while the device is in operation are raised to allow free passage of the water, but which can be closed so as to operate in conjunction with gates 46 located in front of the tunnel in the event anything should go wrong with the turbine. In this event, both gates are closed and the water pumped out through the manhole 44, thus leaving the tunnel between the two gates dry so that the apparatus can be repaired.

To the rear of the tunnels the stream bed is cut away or dredged out, as indicated by the numeral 47. This creates an artificial fall at the rear of the tunnel and speeds up the stream passing therethrough, so that I am not dependent entirely upon the speed of the current of the stream, but a sluggish stream can be made to impart considerable power.

The walls 39 are provided with openings 48, through which water can enter the spillways 41. These openings are designed to be closed by means of flood-gates 49. These flood-gates are preferably counter-balanced by means of weights 50, which are secured to a chain 51, this chain passing over a sprocket 52 carried by the shaft 53. Secured to the walls 39 is a bracket 54, in which a lever 55 is pivotally secured.

Carried by one end of the lever 55 is a float 56, which is adapted to be partially immersed in the water between the walls 39. Secured to the opposite end of the lever 55 is a link 57, which in turn is secured to an arm 58 mounted on the shaft 53. The door 49 is a trifle heavier than the weight 50, so that the tendency of the door at all times will be to travel downward and close the openings 48, but should the level of the water rise between the walls 39, the float 56 will be pushed upward, exerting a pull on the arm 58, thus rotating the shaft 53 and raising the gate. It is not my intention that all of the gates be equipped with this automatic means, as it will be necessary to have a few of the flood-gates manually operated. In this event, the weight 50 will be the same weight as the door and instead of the chain 51, a cable will be substituted so that by raising or lowering the weight 50 manually, the door can be raised or lowered and retained in that position.

It will be noted from Fig. 2 that each one of the shafts 34 drive the sets of generators 17 and 18, and the purpose of having the pulleys 35 connected to the shaft by means of the clutches is that the generators can be run individualy or collectively. They can be run for certain periods of time and then disconnected to permit cooling off without shutting down the turbine, so it is possible to operate any number of the generators as desired, or as found necessary.

In practice, the procedure followed would be to run the generators 17 for a certain number of hours, then to disconnect these generators and throw the generators 18 into operation, thus permitting the generators 17 to cool and prevent over-heating.

Secured to the front of the foremost bearing of each of the shafts 21 is a cone 59. The purpose of this is to divide the oncoming stream, so that the foremost bearing will in no way retard its force. Furthermore, by this construction the stream is directed into the paddles or blades of the turbines rather than against the bearing. It will also be noted from Fig. 5 that instead of using the solid hub for the turbines, I have employed a pulley structure. This permits me to use paddles relatively wide throughout their length, while the pulley structure permits the free passage of water adjacent the shaft and at a point where the fulcrum would be so small as to exert practically no pressure.

If desired, I may erect another unit immediately to the rear of the unit described and another one to the rear of that, this depending a great deal upon the inclination of the stream bed, so that quite a large power unit can be built up in a stream without occupying a great deal of its width.

In Fig. 8 I have shown a modified form of turbine in which spiral sections 60 are used instead of the turbines illustrated in Fig. 5. However, in this construction of turbine, the remainder of the apparatus and its operation will remain the same.

If desired the floor of the power house, in small plants, may be made in the form of a pontoon so as to float in a stream, and the turbines suspended from the lower side thereof and in this way expensive concrete work eliminated, this feature will also make my device portable as it can be moved from place to place in a stream.

Having fully described my invention, what I claim is:

1. A stream motor comprising a cylindrical tunnel, a shaft extending longitudinally of its center, a second shaft located above said tunnel and parallel to the first mentioned shaft, driving means connecting both of said shafts whereby the same will rotate simultaneously, means carried by the first mentioned shaft and adapted to co-operate with water passing through said tunnel for placing said shaft in operation, means for regulating the passage of water through said tunnel whereby the speed of said motor can be controlled, and a by-pass located to one side of said tunnel through which excess water can be diverted past said tunnel, said by-pass being automatically opened and closed by the head of water at the in-take end of said tunnel.

2. The stream motor of claim 1 in which automatically operated counter-balanced vertically movable gates are provided to control admission of water to the by-pass.

In testimony whereof I have affixed my signature.

PASQUALE BUDA.